(12) United States Patent
Oguma

(10) Patent No.: US 6,845,609 B2
(45) Date of Patent: Jan. 25, 2005

(54) APPARATUS AND A METHOD FOR EXHAUST GAS PURIFICATION IN AN INTERNAL COMBUSTION ENGINE

(75) Inventor: Hajime Oguma, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/337,390

(22) Filed: Jan. 7, 2003

(65) Prior Publication Data
US 2003/0131590 A1 Jul. 17, 2003

(30) Foreign Application Priority Data
Jan. 11, 2002 (JP) ........................................ 2002-004643

(51) Int. Cl.$^7$ ................................................ F01N 3/00
(52) U.S. Cl. ............................ 60/285; 60/274; 60/276; 60/297
(58) Field of Search .................... 60/274, 285, 276, 60/295, 297, 280

(56) References Cited

U.S. PATENT DOCUMENTS

| | | | |
|---|---|---|---|
| 5,437,153 A | * | 8/1995 | Takeshima et al. ............ 60/276 |
| 6,119,448 A | * | 9/2000 | Emmerling et al. ........... 60/274 |
| 6,167,696 B1 | * | 1/2001 | Maaseidvaag et al. ......... 60/274 |
| 6,295,808 B1 | * | 10/2001 | Griffin et al. ................... 60/776 |
| 6,467,258 B1 | * | 10/2002 | Jobson et al. .................. 60/285 |
| 6,519,930 B1 | * | 2/2003 | Maus et al. ..................... 60/274 |
| 6,568,179 B2 | * | 5/2003 | Deeba ........................... 60/298 |

FOREIGN PATENT DOCUMENTS

| | | |
|---|---|---|
| JP | 7-189768 A | 7/1995 |
| JP | 7-301140 A | 11/1995 |
| JP | 9-151759 A | 6/1997 |
| JP | 9-242528 A | 9/1997 |
| JP | 10-184422 A | 7/1998 |

* cited by examiner

Primary Examiner—Binh Q. Tran
(74) Attorney, Agent, or Firm—Foley & Lardner LLP

(57) ABSTRACT

In order to improve an exhaust gas purification performance immediately after a cold engine is started, firstly for HC purification, an air-fuel ratio is controlled to be in a lean range immediately after the engine start. Next for NOx purification, the air-fuel ratio is switched to be from lean to rich based upon a parameter (engine load, namely, fuel injection amount) related to NOx density at an engine exit or a parameter (catalyst temperature or water temperature) related to the catalyst temperature. The air-fuel ratio to be rich is set as a plurality of values based upon the parameter and as a richer range as the parameter shows high density or high temperature.

12 Claims, 11 Drawing Sheets

FIG.2
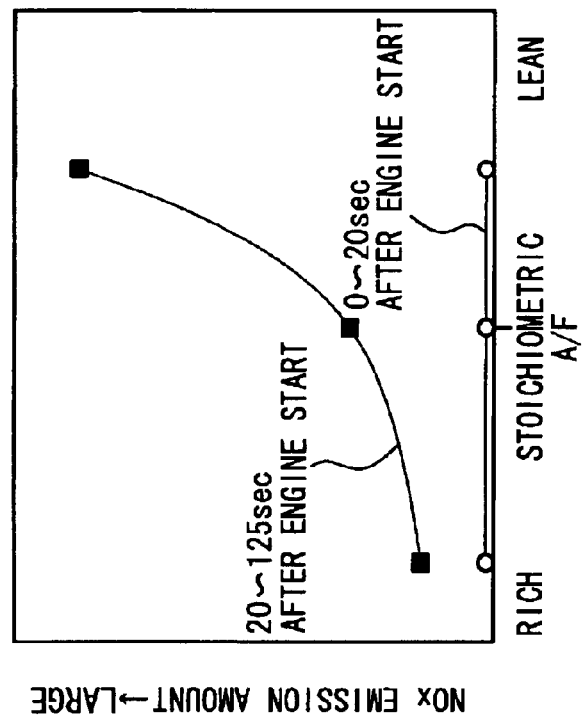
(a) HC EMISSION AMOUNT CHARACTERISTIC
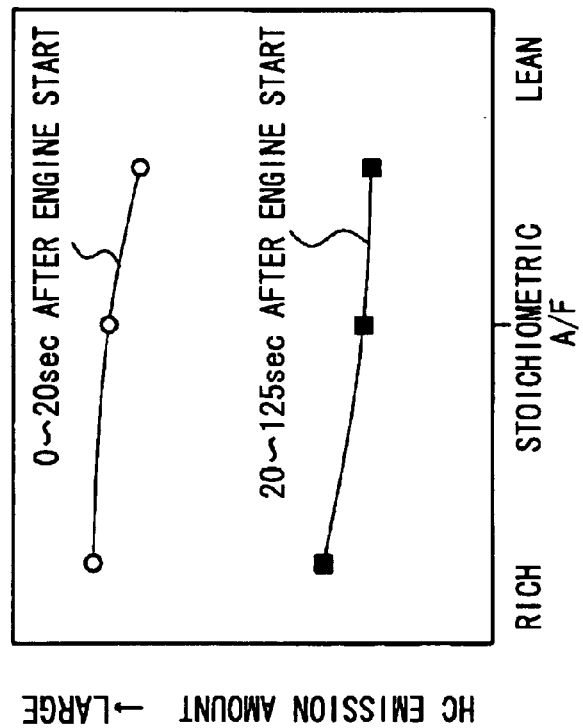
(b) NOx EMISSION AMOUNT CHARACTERISTIC

APPARATUS AND A METHOD FOR EXHAUST GAS PURIFICATION IN AN INTERNAL COMBUSTION ENGINE

BACKGROUND OF THE INVENTION

1. Field of the Invention

The present invention relates to an apparatus and a method for exhaust gas purification in an internal combustion engine with a three-way catalyst disposed in an exhaust gas passage, and more particularly to an air-fuel ratio control for improving the exhaust gas purification immediately after the engine is started.

2. Related Art of the Invention

There is an earlier air-fuel ratio control technology for improving exhaust gas purification immediately after an engine is started where, by reason of a conversion rate of NOx in a catalyst being suddenly lowered more in a lean range of an air-fuel ratio than a stoichiometric value thereof immediately after the engine is started, a target air-fuel ratio in the air-fuel control is shifted more to the rich side than the stoichiometric value, thereby improving the conversion rate of NOx.

There is another earlier air-fuel ratio control technology (Japanese Unexamined Patent Publication No. 7-189768) where an air-fuel ratio is controlled to a lean range immediately after an engine is started and to a rich range at an acceleration time.

Namely, a feedback control is performed at the lean range for a predetermined period immediately after the engine is started and when an acceleration condition is detected during the feedback control in the lean range, the air-fuel ratio is controlled to be rich.

There is a further earlier air-fuel ratio control technology (Japanese Unexamined Patent Publication No. 7-301140) where an air-fuel ratio is controlled to a stoichiometric value immediately after an engine is started, then to a lean range, and thereafter, to the stoichiometric value.

Namely, a feedback correction value (before becoming lean) is stored by feedback-controlling the air-fuel ratio to the stoichiometric value immediately after an engine is started and the air-fuel ratio is feedforward-controlled to the lean range until activation of a catalyst is carried out and subsequently a feedback correction value (after becoming lean) is stored by feedback-controlling the air-fuel ratio to the stoichiometric value.

A target value for a lean air-fuel ratio by a feed forward control at the lean range is corrected by learning control with a present feedback correction value (before becoming lean) and a prior feedback correction value (after becoming lean).

There is a further earlier air-fuel control technology (Japanese Unexamined Patent Publication No. 9-242528) where an air-fuel ratio in an exhaust manifold before a catalyst changes depending on introduction of a secondary air thereto. That is, the air-fuel ratio in the exhaust manifold before the catalyst is controlled to a lean range at a cold catalyst, and then, the air-fuel ratio therein is controlled to a rich range after activation completion of the catalyst.

Namely, at the cold catalyst (from part activation to complete activation), the air-fuel ratio in the exhaust manifold is controlled to the lean range and sulfate is removed by controlling the air-fuel ratio therein to the rich range after the activation completion.

There is a further earlier air-fuel ratio technology (Japanese Unexamined Patent Publication No. 9-151759) where an air-fuel ratio is controlled to a lean range until catalyst activation is carried out and after the catalyst activation is carried out, the air-fuel ratio is controlled to a stoichiometric value.

Namely, the air-fuel ratio is controlled to the lean range when a water temperature does not reach a catalyst activation temperature and after it has reached the catalyst activation temperature, the air-fuel ratio is controlled to the stoichiometric value.

SUMMARY OF THE INVENTION

When an air-fuel ratio is shifted to a rich range by a certain amount immediately after an engine is started as in the earlier air-fuel ratio control technology, NOx conversion efficiency can be made properly, but activation of a catalyst is not only delayed due to the shift to the rich range but also HC and CO conversion efficiencies are deteriorated before and after catalyst activation.

Therefore, the inventors, at first, have proposed that an air-fuel ratio is controlled to a lean range immediately after the engine start and then, switched to a rich range, since NOx density at an engine exit is extremely lean and HC density is extremely rich at the engine exit for an early period (about 0–20 sec after the engine start) immediately after the engine start.

However, when the air-fuel ratio is indiscriminatively controlled to the rich range by a certain amount on switching from lean to rich, the control is not necessarily optimal in terms of exhaust emission amount characteristics of HC and NOx, and also a conversion efficiency thereof at a catalyst.

As one aspect of the present invention, the invention provides an apparatus for exhaust gas purification in an internal combustion engine with a three-way catalyst in an exhaust passage thereof that improves an exhaust gas purification performance immediately after an engine is started.

Therefore, as one aspect of the invention, at first an air-fuel ratio is controlled to be in a lean range immediately after an engine is started, and then switched to be from lean to rich based upon a parameter related to NOx density at an engine exit or to a temperature of the catalyst therein.

The air-fuel ratio controlled to be in the rich range is set as a plurality of values based upon the above parameter and as a richer range as the parameter shows high density or high temperature.

These and other aspects, and features of this invention will be understood from the following description with accompanying drawings.

BRIEF EXPLANATION OF THE DRAWINGS

FIG. 2 is a characteristic view of HC and NOx emission amounts immediately after the engine is started.

DETAILED EXPLANATION OF THE EMBODIMENTS

Embodiments according to the invention will be explained with reference to the drawings as follows.

Figure 1:
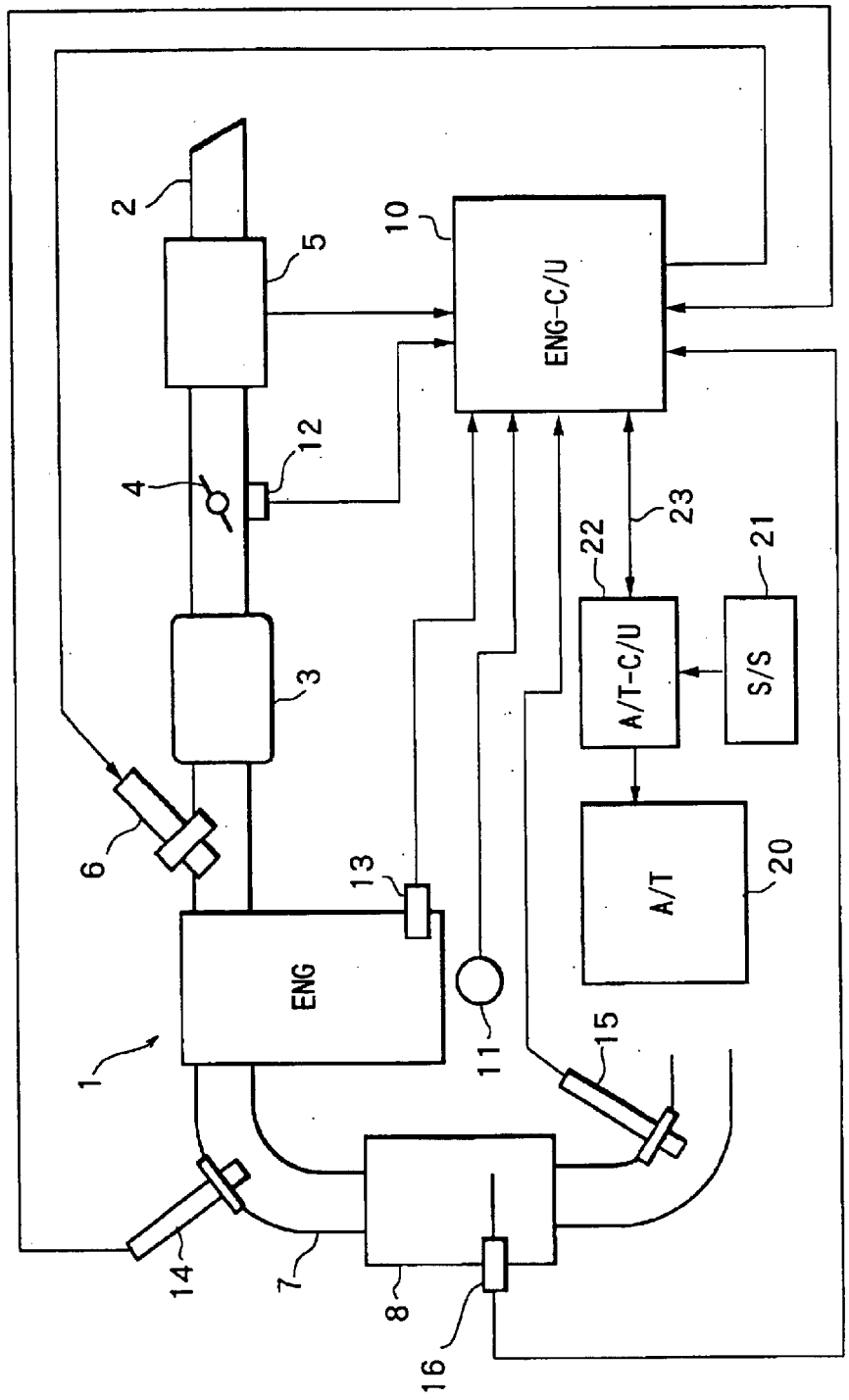
FIG. 1 is a system view of an engine commonly used for a first embodiment—a fourth embodiment according to the invention.

A system arrangement in an internal combustion engine commonly used for a first embodiment—a fourth embodiment is shown in FIG. 1.

In FIG. 1, a throttle valve 4 upstream of an intake manifold 3 in an intake passage 2 in an engine 1 and an airflow meter 5 for detection of an intake air amount QA upstream of throttle valve 4 in intake passage 2 are shown.

A fuel injection valve (injector) 6 for fuel supply is disposed in intake manifold 3 for each cylinder. Fuel injection valve 6 is energized and opened by a fuel injection pulse signal outputted at a predetermined fuel injection timing for each cylinder from an engine control unit 10 and a fuel injection amount thereof is controlled by the pulse width.

A three-way catalyst (manifold catalyst) 8 for exhaust gas purification is disposed in an exhaust passage 7 (right under an exhaust manifold) of engine 1.

Other than the signal from airflow meter 5, a signal from a crank angle sensor 11 which detects an engine rotation speed NE, a signal from an idle switch 12 which switches on at a fully closed position of throttle valve 4, and a signal from a water temperature sensor 13 which detects a cooling water temperature TW of engine 1 are input to engine control unit 10.

Exhaust gas sensors 14,15 (front exhaust gas sensor 14 and rear exhaust gas sensor 15) which detect exhaust gas components in the exhaust gases are disposed respectively upstream and downstream of catalyst 8 in exhaust passage 7 and these signals are input to engine control unit 10.

As needed further, a catalyst temperature sensor 16 which detects a temperature TC of catalyst 8 (catalyst temperature TC) directly or an exhaust gas temperature close to catalyst temperature TC indirectly is disposed and this signal is also input to engine control unit 10. An automatic transmission 20 connected to an output shaft of engine 1 is controlled by a signal from an A/T control unit 22 which receives a selection signal from a shift selector 21 and so on.

Engine control unit 10 and A/T control unit 22 are connected by a communication line 23 and thereby, engine control unit 10 can detect a shift from N (neutral range) to D (drive range) in automatic transmission 20.

Coping with recently tightened exhaust emission regulations, a goal that an exhaust gas emission performance be equal to an atmosphere level has been made, but there is the case where the NOx emission amount from a tailpipe is large at a cold engine start as well as the HC emission amount.

In terms of an exhaust mode test, the NOx emission amount from the tailpipe at a first step (0–125 sec after the engine start) occupies the most part (80–90%) of a total (all steps).

FIG. 2 shows a respective integral value of the HC emission amount and NOx emission amount from the tailpipe in response to change of an air-fuel ratio (A/F) at the first step of the exhaust mode test, separately for 0–20 sec after the engine start (first idle) and for 20–125 sec after the engine start (vehicle start—first step completion).

As shown in FIG. 2($a$), as for HC, HC emission amount from the tailpipe is very large for a short period of 0–20 sec after the engine start and is small for a long period of 20–125 sec after the engine start. HC emission amount for either period is reduced by leanness of an air-fuel ratio and increases by richness thereof.

As shown in FIG. 2($b$), as for NOx, the NOx emission amount from the tailpipe is very small for 0–20 sec after the engine start regardless of change of A/F and rapidly increases for 20–125 sec after the engine start by leanness of the air-fuel ratio and rapidly reduces by richness thereof.

Namely, the engine temperature is very low and NOx density at an engine exit for 0–20 sec after the engine start is low. Therefore, the NOx emission amount from the tailpipe is small regardless of the change of A/F. On the other hand, for this period, HC density at the engine exit is the highest and also the manifold catalyst is not well activated and therefore, the HC emission amount from the tailpipe is large. Accordingly, by setting priority on HC purification performance and controlling the air-fuel ratio to be in a lean range for this period, HC conversion efficiency and manifold catalyst activation can be promoted.

The manifold catalyst is substantially activated for a period of 20–125 sec after the engine is started during which the HC emission amount from the tailpipe reduces due to decrease of HC density at the engine exit and activation of the manifold catalyst, but the NOx emission amount from the tailpipe increases due to increase of NOx density at the engine exit.

On the other hand, the NOx emission amount can be reduced by richness of A/F and the increase of the HC emission amount is small. Accordingly, by shifting the air-fuel ratio to the rich range (setting priority on NOx purification performance for this period), the NOx emission amount can be reduced by a large margin while maintaining the HC emission amount at a minimum.

Therefore, as one aspect of the invention, at first an air-fuel ratio is controlled to be in a lean range immediately after an engine is started, and then switched to be from the lean to rich based upon a parameter related to NOx density at an engine exit or to a temperature of the catalyst therein.

The air-fuel ratio controlled to be in the rich range is set as a plurality of values based upon the above parameter and as a richer range as the parameter shows high density or high temperature.

The air-fuel ratio continues to be in the rich state until the air-fuel ratio feedback control is possible due to activation of the exhaust gas sensor (rear exhaust gas sensor) downstream of the catalyst and after the activation of the rear exhaust gas sensor, the air-fuel ratio is feedback-controlled to a stoichiometric value ($\lambda$=1) based upon output of the sensor.

Such air-fuel ratio control immediately after the engine is started can be performed in an arrangement wherein a target air-fuel ratio (target A/F) used for calculation of a fuel injection amount of fuel injection valve 6 is set at engine control unit 10.

The air-fuel ratio control immediately after the engine start at engine control unit will be explained for each of the first embodiment—the fourth embodiment as follows. Firstly, the first embodiment according to the invention will be explained.

In this embodiment, an engine load (especially, fuel injection amount) is used as a parameter related to NOx density at an engine exit.

Figure 3:
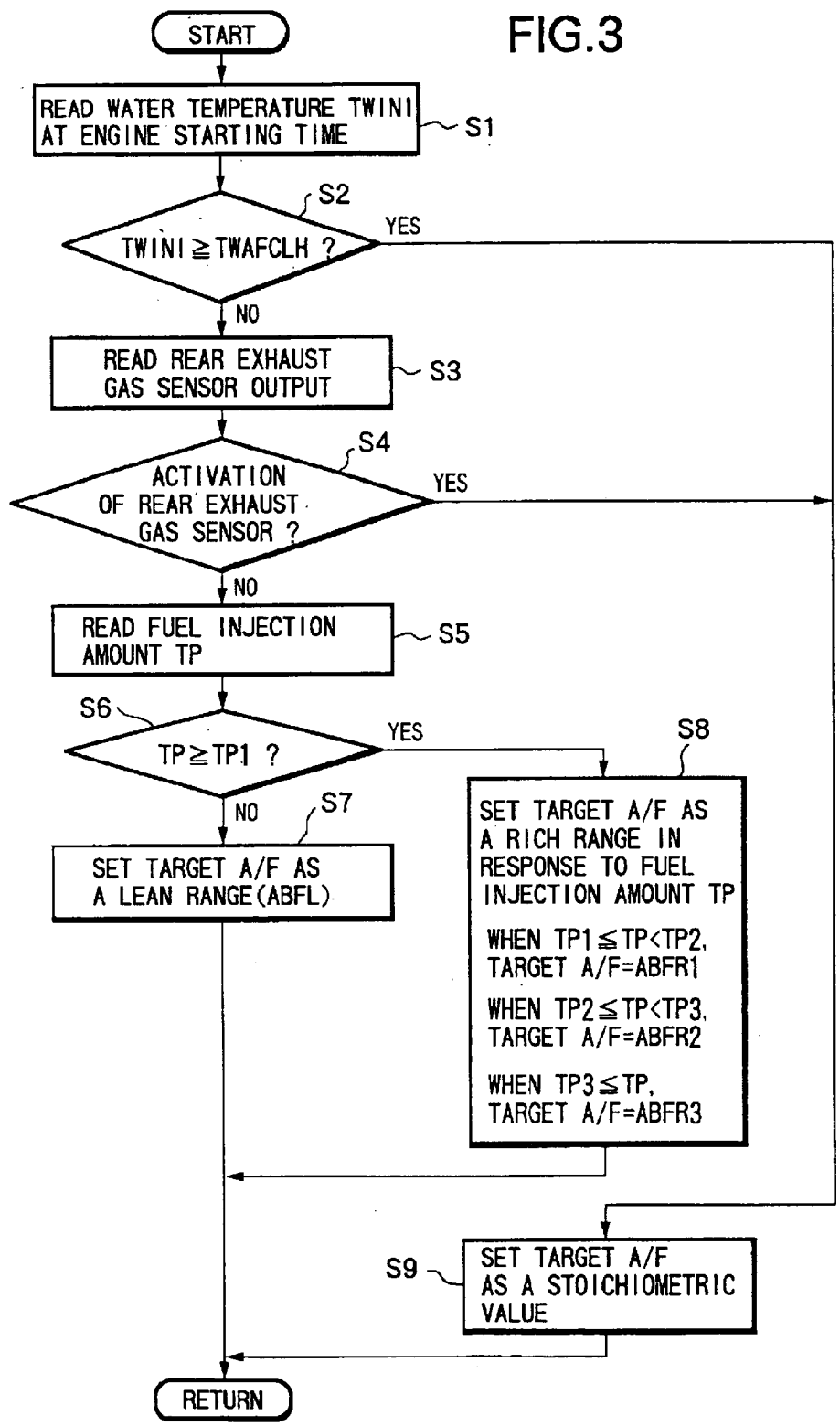
FIG. 3 is a flowchart of an air-fuel ratio control of the first embodiment.

FIG. 3 is a flowchart of the air-fuel ratio control of the first embodiment.

At step S 1, a water temperature at an engine starting time TWINI is read. Water temperature TW is detected based upon a signal of water temperature sensor 13 at the engine starting time and is stored as water temperature TWINI at the engine starting time (TWINI=TW).

At step S 2, it is judged whether or not water temperature TWINI at the engine starting time is more than a cold judgment water temperature TWAFCLH. When TWINI<TWAFCLH, the engine is at a cold engine start and the process goes to step S 3. When TWINI>TWAFCLH, the engine is at a hot engine start and the process goes to step S 9 where target A/F is set as a stoichiometric value (14.7;λ=1) and the process returns. At step S 3, an output of rear exhaust gas sensor 15 is read and next at step S 4, it is judged whether or not rear exhaust gas sensor 15 is activated. The output of rear exhaust gas sensor does not vary from a certain level before activation thereof and varies with activation thereof.

Therefore, the activation of rear exhaust gas sensor 15 is judged based upon the output thereof. When the rear exhaust gas sensor is not activated, the process goes to step S 5. When the rear exhaust gas sensor is activated, the process goes to step S 9 where the target air-fuel ratio is set as a stoichiometric value (14.7;λ=1) and returns.

At step S 5, the engine is at a state immediately after the cold engine start and therefore, firstly an engine load, namely, a fuel injection amount (fuel injection pulse width) TP representative of the engine load is read as a parameter related to NOx emission amount at an engine exit. The fuel injection amount TP is calculated based upon the intake air amount QA and the engine rotation speed NE.

At step S 6, it is judged whether or not TP<TP 1 by comparing the fuel injection amount TP with a predetermined rich shift judgment value TP 1.

When TP<TP 1, the process goes to step S 7 where the target air-fuel ratio is set as a lean range ABFL for setting priority on promoting HC purification performance and the process returns.

When TP≧TP 1, the process goes to step S 8 where the target air-fuel ratio is set as a rich range for promoting NOx emission performance and returns. The air-fuel ratio is set as the richer range in response to the fuel injection amount TP as the fuel injection amount TP becomes large.

In detail, the target air-fuel ratio is set as a plurality of values (at least two). For example, TP 1≦TP<TP 2 - - - Target air-fuel ratio=ABFR 1.

TP 2≦TP<TP 3 - - - Target air-fuel ratio=ABFR 2.

TP 3≦TP - - - Target air-fuel ratio=ABFR 3, wherein ABFR 1>ABFR 2>ABFR 3.

ABFR 3 is the richest air-fuel ratio and in this way, the air-fuel ratio is controlled to the rich range as three kinds of values, but not limited to three values.

Figure 4:
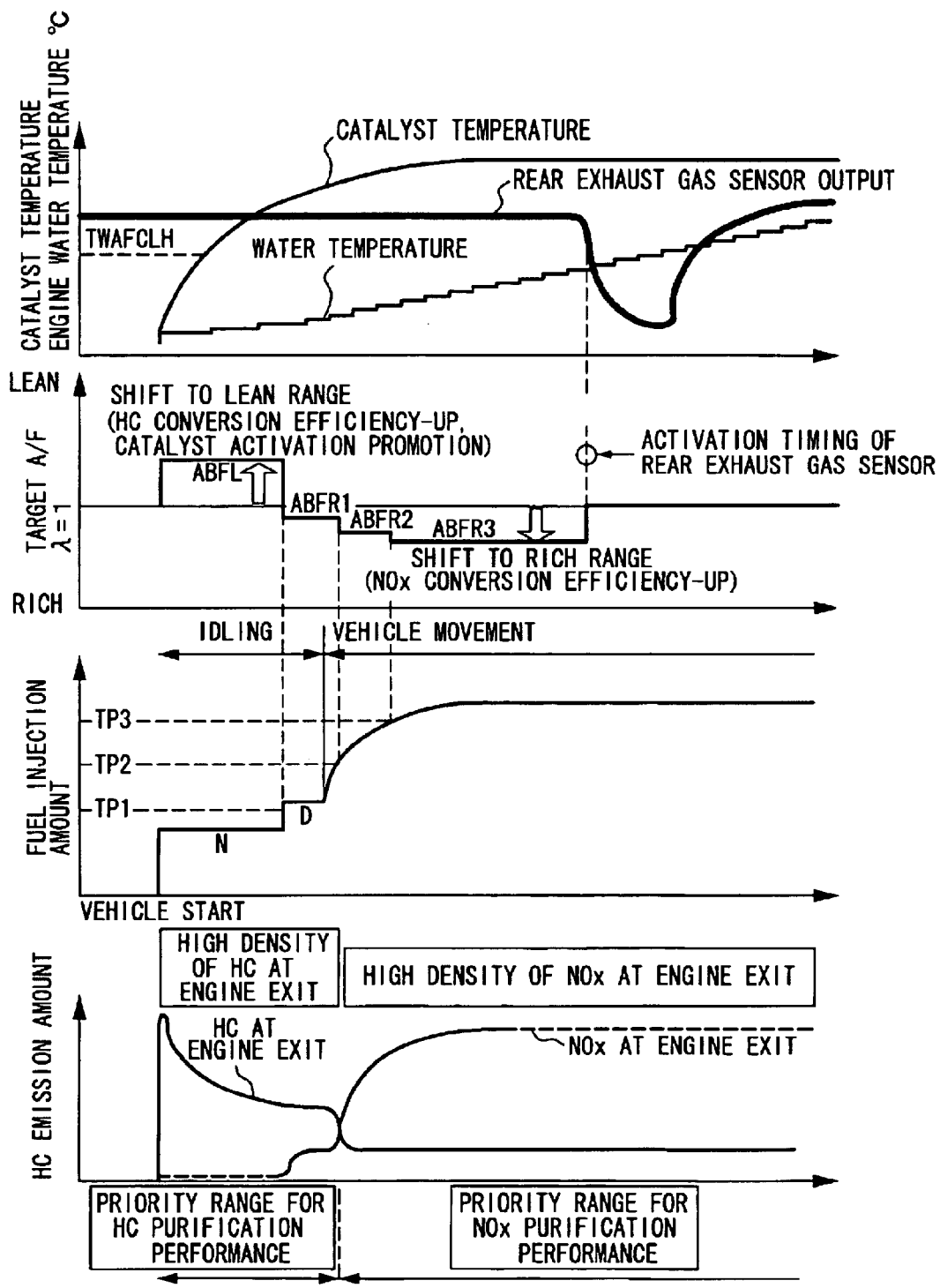
FIG. 4 is a time chart immediately after the engine is started of the first embodiment.

FIG. 4 is a time chart showing one example of an air-fuel ratio control of the first embodiment. Since the fuel injection amount immediately after the engine is started is less than TP 1, the air-fuel ratio is set to be a lean range (ABFL).

At this moment, the NOx emission amount at the engine exit is small and the HC emission amount at the engine exit is large. Accordingly, HC conversion efficiency and catalyst activation are promoted by shifting the air-fuel ratio to the lean range for setting priority on promoting HC purification performance.

When the fuel injection amount exceeds TP 1 (in this example, the same time when from N range to D range is selected), shifting the air-fuel ratio to the lean range is prohibited and the target air-fuel ratio is set to be the rich range (ABFR 1).

As the fuel injection amount gets further larger and exceeds TP 2 and TP 3, the target air-fuel ratio is set to be richer (ABFR 2, ABFR 3). When the engine load (fuel injection amount) becomes large, the HC emission amount is lowered and on the other hand, the NOx emission amount increases. Therefore, by prohibiting shift to the lean range and by controlling the air-fuel ratio to be richer, NOx conversion efficiency is improved.

Thereafter, when it is detected that rear exhaust gas sensor 15 is activated due to output change of rear exhaust gas sensor 15, the target air-fuel ratio is set as a stoichiometric value and the air-fuel ratio feedback control thereto will be started.

According to the first embodiment, since NOx density at the engine exit is very low for an early period (about 0–20 sec) immediately after the engine start and HC density at the engine exit is very high, an exhaust gas purification performance is improved by setting priority on HC purification performance, that is, by firstly controlling the air-fuel ratio to the lean range immediately after the engine is started.

Thereafter, by shifting the air-fuel ratio from lean to rich based upon a parameter related to the NOx density at the engine exit, the exhaust gas purification performance is improved by setting priority on NOx purification performance in response to increase of the NOx emission amount.

The air-fuel ratio to be controlled to be in the rich range is set as a plurality of values based upon a parameter related to NOx density at the engine exit and also to be in the richer range as the parameter becomes large and therefore, an optimal shift to the rich range corresponding to an increase level of the NOx emission amount can be done and a total exhaust gas purification performance can be realized.

According to the first embodiment, the engine load (fuel injection amount) is used as a parameter related to NOx density at an engine exit, since the engine load has a strong relationship with NOx density such that NOx density, in general, increases due to increase of the engine load and also is a necessary parameter for an engine control. Therefore, without adding another sensor, the air-fuel ratio control can be performed.

Also, according to the first embodiment, by keeping the air-fuel ratio to be in the rich range until the air-fuel ratio feedback control becomes possible to perform due to activation of the exhaust gas sensor downstream of the catalyst, and further by feedback-controlling the air-fuel ratio to the stoichiometric value based upon an output of the exhaust gas sensor after the sensor is activated, the exhaust gas purification performance can be improved before and after its activation.

A second embodiment according to the invention will be explained. The embodiment relates to an air-fuel ratio control using an idle switch.

Figure 5:
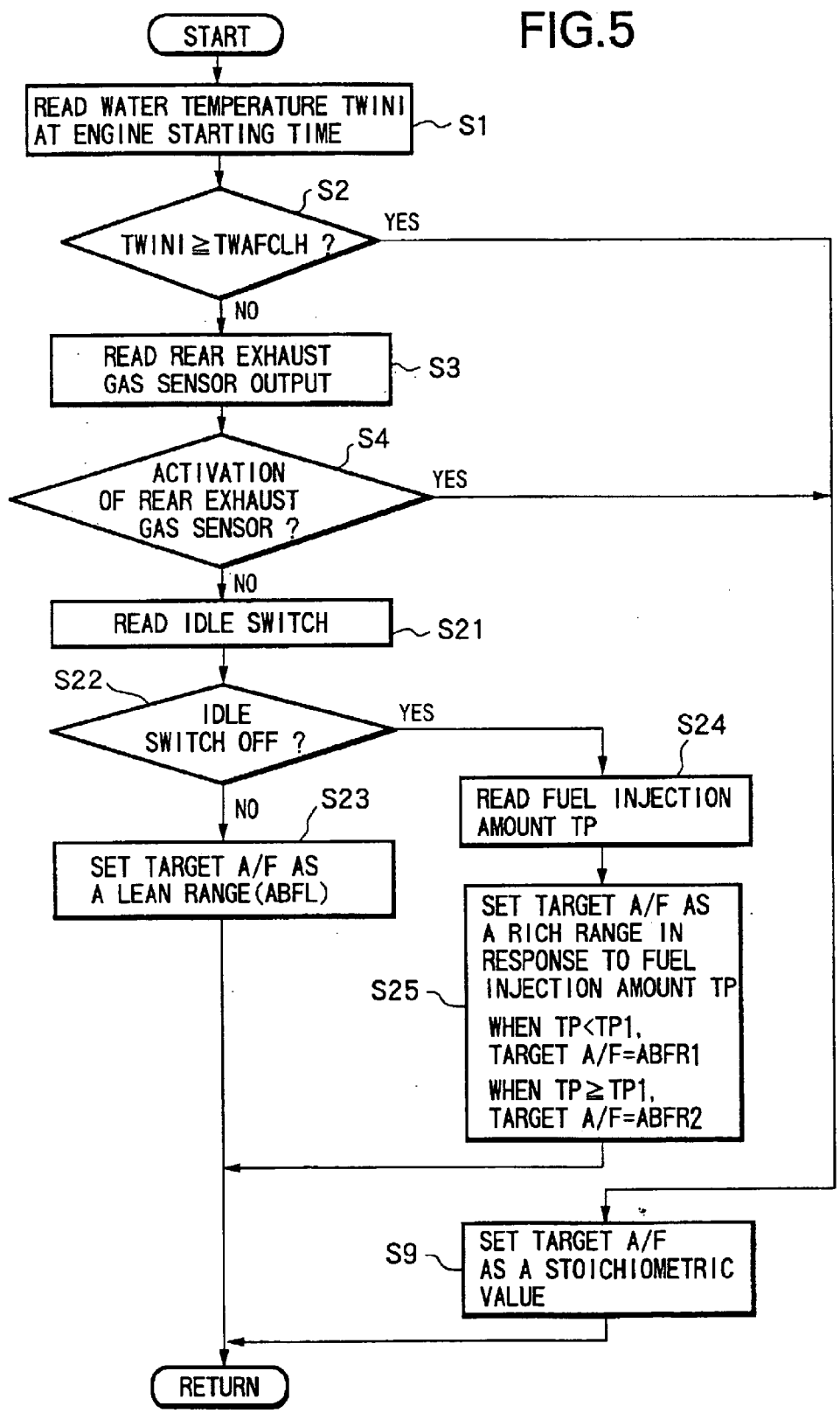
FIG. 5 is a flowchart of an air-fuel ratio control of the second embodiment.

FIG. 5 is a flowchart of an air-fuel ratio control according to the second embodiment. Step S 1–step S 4, and step S 9 in the flowchart in FIG. 5 are the same as in the flowchart in FIG. 3 and an explanation thereof is omitted.

When at step S 2, it is judged that a water temperature at an engine starting time TWINI<a cold judgment water temperature TWAFCLH and at step S 4, the rear exhaust gas sensor is not activated (immediately after cold engine start), the process goes to step S 21. At step S 21, idle switch 12 is read as an indicating value of the engine load.

At step S 22, it is judged whether or not idle switch 12 switches off (acceleration condition). When idle switch 12 switches on (idling condition), the process goes to step S 23 where a target A/F is set as a lean air-fuel ratio predetermined and adapted for the idling condition for setting priority on HC purification performance and returns.

When idling switch 12 switches off (acceleration condition), the process goes to S 24 where a fuel injection amount TP representative of the engine load is read and the process goes to step S 25 where a target A/F is set as a rich air-fuel ratio for setting priority on NOx purification performance and returns.

The air-fuel ratio is set as the richer range in response to the fuel injection amount TP as the fuel injection amount TP becomes large.

In detail, the target air-fuel ratio is set as a plurality of values (at least two). For example, $TP<TP$ 4 - - - Target air-fuel ratio=ABFR 1.

$TP \geq TP$ 4 - - - Target air-fuel ratio=ABFR 2, wherein ABFR 1>ABFR 2.

ABFR 2 is the richer air-fuel ratio and in this way, the air-fuel ratio is controlled to the rich range as two kinds of values, but not limited to two kinds of values, and may be controlled to more than two.

Figure 6:
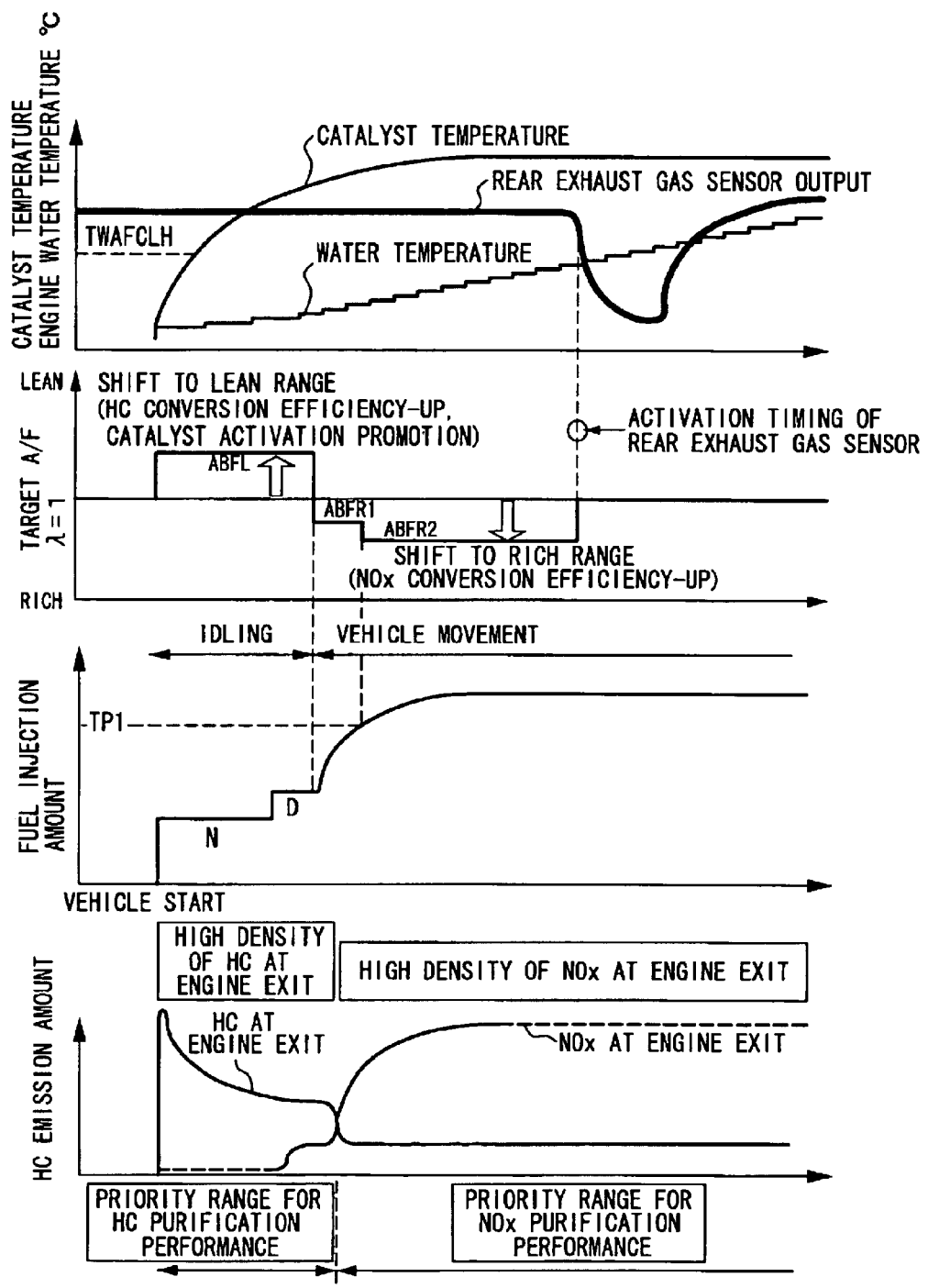
FIG. 6 is a time chart immediately after the engine is started of the second embodiment.

FIG. 6 is a time chart showing one example of the air-fuel ratio control of the second embodiment. Since the engine is at an idling condition immediately after the engine is started, the air-fuel ratio is set to be the lean range (ABFL).

At this moment, the NOx emission amount at the engine exit is small and the HC emission amount at the engine exit is large. Accordingly, HC conversion efficiency and catalyst activation are promoted by shifting the air-fuel ratio to the lean range for setting priority on promoting HC purification performance.

When the idle switch switches off (acceleration condition) by pushing down an acceleration pedal (vehicle movement), shifting the air-fuel ratio to the lean range is prohibited and the target air-fuel ratio is set to be the rich range (ABFR 1).

As the fuel injection amount gets further larger and exceeds TP 4, the target air-fuel ratio is set to be richer (ABFR 2). When the engine load (fuel injection amount) becomes larger at the acceleration condition, the HC emission amount is lowered more and on the other hand, the NOx emission amount increases more. Therefore, by prohibiting shift to the lean range and by controlling the air-fuel ratio to be richer for setting priority on NOx purification performance, NOx conversion efficiency is improved.

According to the second embodiment, in particular, by prohibiting the lean air-fuel ratio control and shifting to the rich air-fuel ratio control during an acceleration condition (idle switch switches off), the control is properly separated between before and after a vehicle movement and delay of a shift timing to the rich range can be prevented. Instead of detecting the idle switch as an acceleration condition, a shift from N to D in an automatic transmission may be detected and the air-fuel ratio control may be switched to the rich range by prohibiting the lean air-fuel ratio control on the shift timing from N to D.

A third embodiment according to the invention will be explained. The embodiment uses a parameter related to a catalyst temperature.

Figure 7:
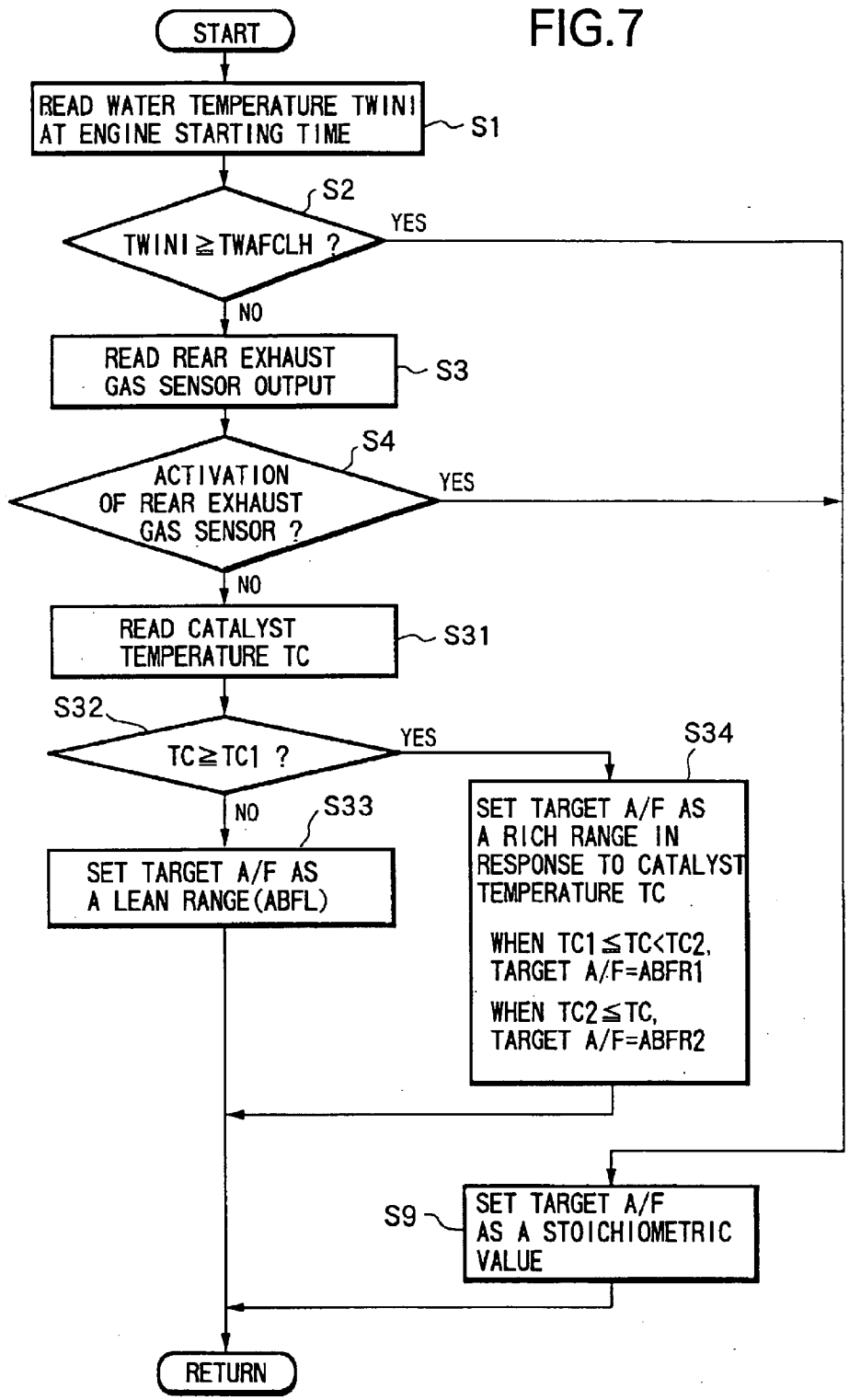
FIG. 7 is a flowchart of an air-fuel ratio control of the third embodiment.

FIG. 7 is a flowchart of an air-fuel ratio control according to the third embodiment. Step S 1–step S 4, and step S 9 in the flowchart in FIG. 7 are the same as in the flowchart in FIG. 3 and an explanation thereof is omitted.

When at step S 2, it is judged that a water temperature at an engine starting time TWINI<a cold judgment water temperature TWAFCLH and at step S 4, the rear exhaust gas sensor is not activated (immediately after cold engine start), the process goes to step S 31. At step S 31, as a parameter related to a temperature of a catalyst, the temperature TC of the catalyst detected directly by a catalyst temperature sensor 16, detected indirectly, or the temperature TC estimated based upon calculation of a gas amount flowing into the catalyst is read.

At step S 32, it is judged whether or not TC>TC 1 by comparing the catalyst temperature TC with a predetermined rich shift judgment value TC 1.

When TC<TC 1, the process goes to step S 33 where the target air-fuel ratio is set as a lean range ABFL predetermined for setting priority on promoting HC purification performance and the routine returns.

When TC>TC 1, the process goes to step S 34 where the target air-fuel ratio is set as a rich range for setting priority on promoting NOx emission performance and returns. The air-fuel ratio is set as the richer range in response to the catalyst temperature TC as the catalyst temperature TC becomes high.

In detail, the target air-fuel ratio is set as a plurality of values (at least two).

For example, $TC\ 1 \leq TC<TC$ 2 - - - Target air-fuel ratio=ABFR 1.

$TC\ 2<TC$ - - - Target air-fuel ratio=ABFR 2, wherein ABFR 1>ABFR 2.

ABFR 2 is the richer air-fuel ratio and in this way, the air-fuel ratio is controlled to the rich range as two kinds of values, but not limited to two kinds of values and may be controlled to more than two.

Figure 8:
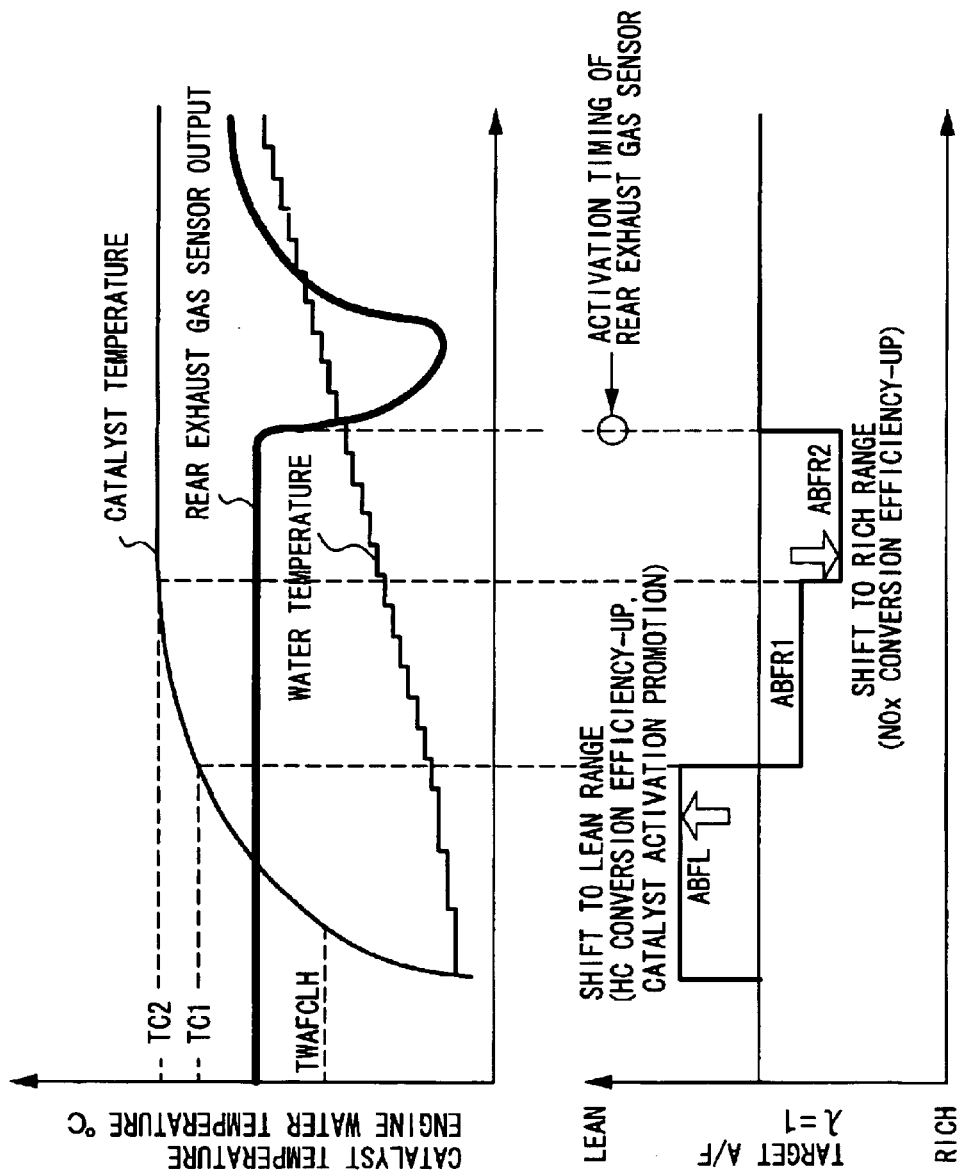
FIG. 8 is a time chart immediately after the engine is started of the third embodiment.

FIG. 8 is a time chart showing one example of the air-fuel ratio control of the third embodiment. Since the catalyst temperature immediately after the engine is started is less than TC 1, the air-fuel ratio is set to be the lean range (ABFL).

At this moment, the NOx emission amount at the engine exit is small and the HC emission amount at the engine exit is large. Accordingly, HC conversion efficiency and catalyst activation are promoted by shifting the air-fuel ratio to the lean range for setting priority on promoting HC purification performance.

When the catalyst temperature exceeds TC 1, shifting the air-fuel ratio to the lean range is prohibited and the target air-fuel ratio is set to be the rich range (ABFR 1).

When the catalyst temperature gets further higher and exceeds TC 2, the target air-fuel ratio is set to be richer (ABFR 2).

When the catalyst temperature becomes high, the HC emission amount is lowered and on the other hand, the NOx emission amount increases. Therefore, by prohibiting shift to the lean range and by controlling the air-fuel ratio to be richer for setting priority on NOx purification performance, NOx conversion efficiency is improved.

Figure 9:
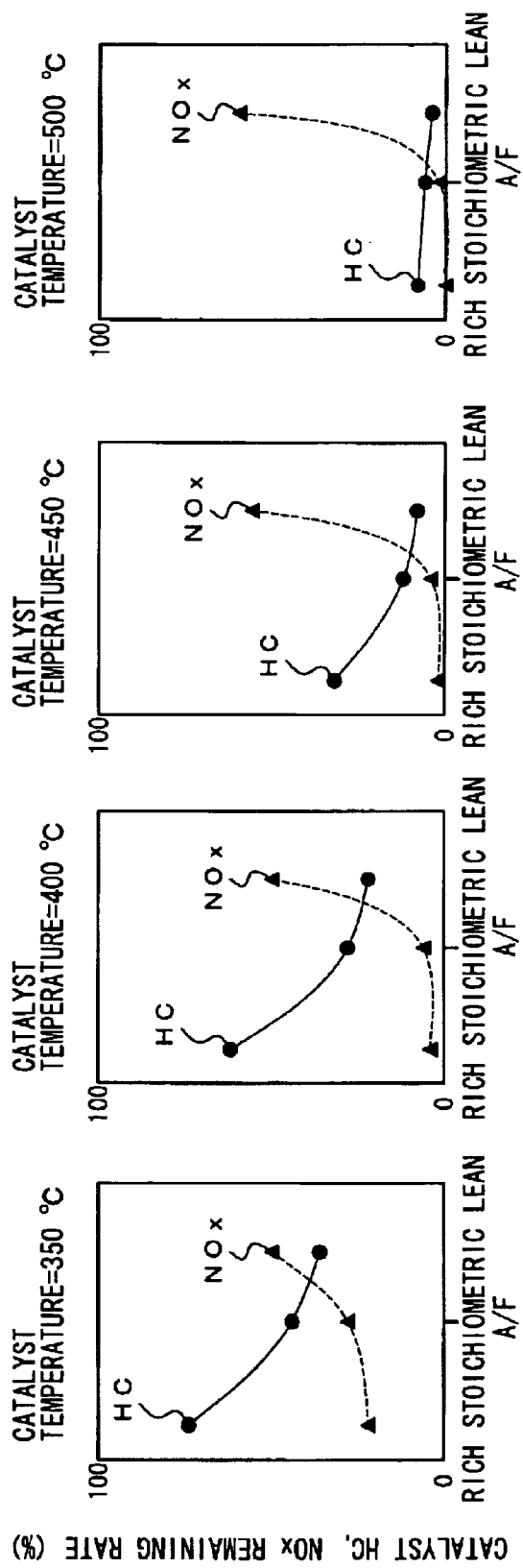
FIG. 9 is a characteristic view of HC and NOx remaining rates at a temperature for each catalyst.

FIG. 9 shows an HC remaining rate and a NOx remaining rate in the catalyst at each catalyst temperature (350° C., 400° C., 450° C., 500° C.) corresponding to change of A/F (stoichiometric, rich, lean). It is shown from FIG. 9 that at a low temperature range (350° C., 400° C.), the HC remaining rate, especially at the rich range is high due to deterioration of HC conversion efficiency, but the NOx remaining rate gets high by shifting to the lean range. Therefore, it is preferable that the air-fuel ratio be at a stoichiometric side of the rich range. At a high temperature range (450° C., 500° C.) the HC remaining rate is lowered very much due to an improved HC conversion efficiency and on the other hand, the NOx remaining rate at the lean range rapidly increases. This indicates that the air-fuel ratio should be controlled to be in the richer range at this time.

According to the third embodiment, since NOx density at the engine exit is very low for an early period (about 0–20 sec) immediately after the engine start and HC density at the engine exit is very high, an exhaust gas purification performance is improved by setting priority on HC purification performance, that is, by firstly controlling the air-fuel ratio to the lean range immediately after the engine is started.

Thereafter, by shifting the air-fuel ratio from lean to rich based upon a parameter related to NOx density at the engine exit, the exhaust gas purification performance is improved by setting priority on NOx purification performance in response to increase of the NOx emission amount.

The air-fuel ratio to be controlled to be in the rich range is set as a plurality of values based upon a parameter related to the catalyst temperature and also to be in the richer range as the parameter becomes high and therefore, an optimal shift to the rich range in response to a level of the improved HC conversion efficiency at the catalyst is done and an effective total exhaust gas purification performance can be realized.

According to the third embodiment, the catalyst temperature detected or estimated is used as a parameter related to the catalyst temperature. This is easily done by mounting a catalyst temperature sensor or by estimation based upon an engine operating condition.

A fourth embodiment according to the invention will be explained. In the embodiment, an engine temperature (especially, water temperature) is used as a parameter related to a catalyst temperature.

Figure 10:
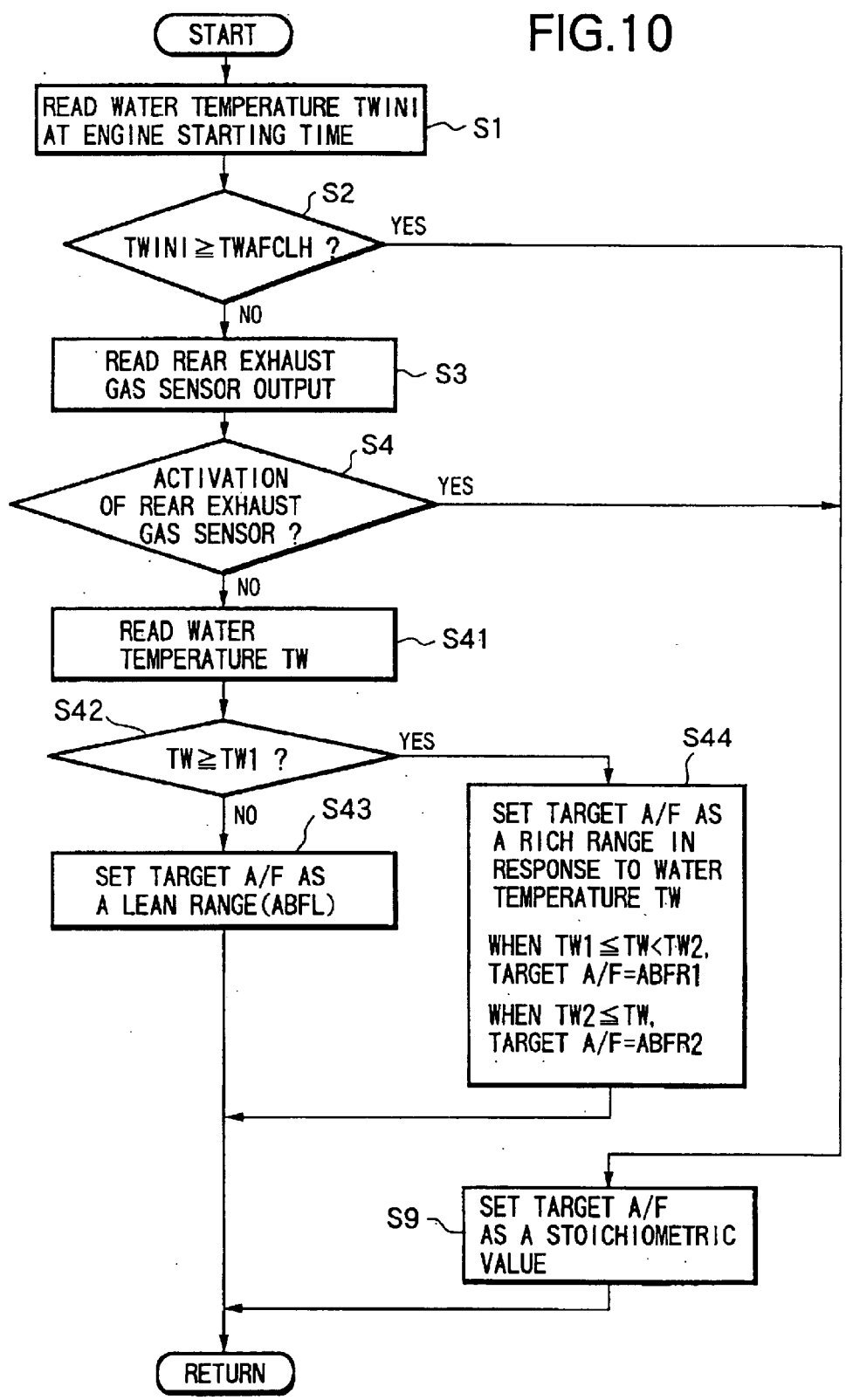
FIG. 10 is a flowchart of an air-fuel ratio control of the fourth embodiment.

FIG. 10 is a flowchart of an air-fuel ratio control according to the fourth embodiment. Step S 1–step S 4, and step S 9 in the flowchart in FIG. 10 are the same as in the flowchart in FIG. 3 and an explanation thereof is omitted.

When at step S 2, it is judged that a water temperature at an engine starting time TWINI<a cold judgment water temperature TWAFCLH and at step S 4, the rear exhaust gas sensor is not activated (immediately after cold engine start), the process goes to step S 41. At step S 41, as a parameter related to the catalyst temperature, the engine temperature namely, the water temperature TW is read based on a signal from water sensor 13.

At step S 42, it is judged whether or not TW≧TW 1 by comparing the detected water temperature TW with a predetermined rich shift judgment value TW 1.

When TW<TW 1, the process goes to step S 43 where the target air-fuel ratio is set as a lean range ABFL for setting priority on promoting HC purification performance and returns.

When TW≧TW 1, the process goes to step S 44 where the target air-fuel ratio is set as a rich range for setting priority on promoting NOx emission performance and returns. The rich air-fuel ratio is set as the richer range in response to the water temperature TW as the water temperature TW becomes high.

In detail, the target air-fuel ratio is set as a plurality of values (at least two). For example, $TW\ 1 < TW < TW\ 2$ - - - Target air-fuel ratio=ABFR 1

$TW\ 2 \leq TW$ - - - Target air-fuel ratio=ABFR 2 wherein ABFR 1>ABFR 2.

ABFR 2 is the richer air-fuel ratio and in this way, the air-fuel ratio is controlled to the rich range as two kinds of values, but not limited to two kinds of values and may be controlled to more than two.

Figure 11:
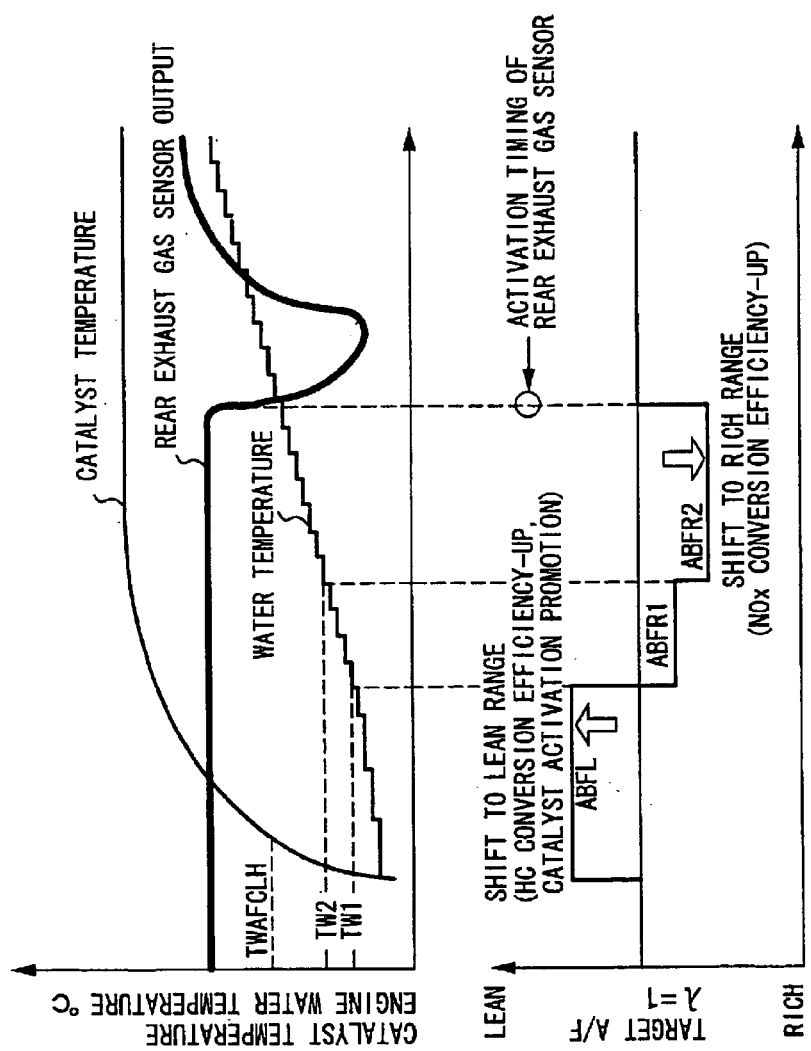
FIG. 11 is a time chart immediately after the engine is started of the fourth embodiment.

FIG. 11 is a time chart showing one example of an air-fuel ratio control of the fourth embodiment. Since the water temperature immediately after the engine is started is less than TW 1, the air-fuel ratio is set to be the lean range (ABFL).

At this moment, the NOx emission amount at the engine exit is small and the HC emission amount at the engine exit is large. Accordingly, HC conversion efficiency and catalyst activation are promoted by shifting the air-fuel ratio to the lean range for setting priority on promoting HC purification performance.

When the water temperature exceeds TW 1, shifting the air-fuel ratio to the lean range is prohibited and the target air-fuel ratio is set to be the rich range (ABFR 1).

When the water temperature gets further higher and exceeds TW 2, the target air-fuel ratio is set to be the richer (ABFR 2).

When the water temperature becomes high, since the catalyst temperature gets high following it, the HC emission amount is lowered due to the improved HC conversion efficiency and on the other hand, the NOx emission amount increases due to the high temperature. Therefore, by prohibiting shift to the lean range and by controlling the air-fuel ratio to be richer for setting priority on NOx purification performance, NOx conversion efficiency is improved.

According to the fourth embodiment, in particular, in case the engine temperature is used as a parameter related to the catalyst temperature, since the engine temperature has a strong relationship with the catalyst temperature and also is a necessary parameter for an engine control, the embodiment can be easily implemented.

As for the third and fourth embodiments, there may be added a control that on detecting an acceleration condition (idle switch-off or shift timing from N to D), a shift of the air-fuel ratio to the lean range is prohibited and the air-fuel ratio is switched to the rich range as in the second embodiment.

This application claims priority to Japanese Patent Application No. 2002-4004643 filed Jan. 11, 2002. The entire disclosure of Japanese Patent Application No. 2002-004643 is hereby incorporated herein by reference.

While only selected embodiments have been chosen to illustrate the present invention, it will be apparent to those skilled in the art from this disclosure that various changes and modifications can be made herein without departing from the scope of the invention as defined with reference to the appended claims.

Furthermore, the foregoing description of the embodiments according to the present invention is provided for illustration only, and not for the purpose of limiting the invention as defined by the appended claims and their equivalents.

What is claimed:

1. An apparatus for an exhaust gas purification in an internal combustion engine comprising:
    a three-way catalyst disposed in an exhaust passage in the engine;

a fuel injector for fuel supply to the engine;

an engine operating condition detecting unit which detects an engine operating condition; and an engine control unit which sets an air-fuel ratio in response to the engine operating condition and controls a fuel injection amount of the fuel injector based upon the air-fuel ratio, wherein the engine control unit obtains a parameter related to NOx density at an engine exit or related to a catalyst temperature, wherein the engine control unit controls the air-fuel ratio to a lean range immediately after the engine is started and thereafter, to a rich range and performs switching the air-fuel ratio from lean to rich based upon the parameter, and wherein the engine control unit sets the air-fuel ratio controlled to be in the rich range as one of a plurality of values based upon the parameter, and also richer as the parameter shows higher NOx density or higher catalyst temperature.

2. An apparatus according to claim 1, wherein the parameter related to NOx density at the engine exit is an engine load.

3. An apparatus according to claim 1, wherein the parameter related to the catalyst temperature is the catalyst temperature detected or estimated.

4. An apparatus according to claim 1, wherein the parameter related to the catalyst temperature is an engine temperature.

5. An apparatus according to claim 1, wherein the engine control unit prohibits controlling the air-fuel ratio to the lean range and switches the air-fuel ratio to the rich range when an acceleration condition is detected.

6. An apparatus according to claim 5, further comprising:

a throttle valve disposed in an intake passage; and an idle switch which switches on at a fully closed position of the throttle valve, wherein the acceleration condition is detected by the idle switch switching off.

7. An apparatus according to claim 5, further comprising:

an automatic transmission connected to the engine, wherein the acceleration condition is detected by a shift of from N range to D range in the automatic transmission.

8. An apparatus according to claim 1, further comprising:

an exhaust gas sensor disposed downstream of the catalyst in the exhaust passage, wherein the engine control unit continues to control the air-fuel ratio to the rich range until the air-fuel ratio is feedback-controlled due to activation of the exhaust gas sensor.

9. An apparatus according to claim 8, wherein after the exhaust gas sensor is activated, the air-fuel ratio is feedback-controlled to a stoichiometric value based upon output of the exhaust gas sensor.

10. An apparatus for an exhaust gas purification in an internal combustion engine comprising:

a three-way catalyst disposed in an exhaust passage in the engine;

fuel injection means for supplying fuel to the engine;

engine operating condition detecting means for detecting an engine operating condition; and engine control means for setting an air-fuel ratio in response to the engine operating condition and for controlling a fuel injection amount of the fuel injection means based upon the air-fuel ratio, wherein the engine control means comprises:

parameter obtaining means for obtaining a parameter related to NOx density at an engine exit or related to a catalyst temperature;

air-fuel ratio switching means for controlling the air-fuel ratio to a lean range immediately after the engine is started and thereafter, to a rich range and for performing switching the air-fuel ratio from lean to rich based upon the parameter; and rich air-fuel ratio setting means for setting the air-fuel ratio controlled to be in the rich range as one of a plurality of values based upon the parameter, and also richer as the parameter shows higher NOx density or higher catalyst temperature.

11. A method for an exhaust gas purification in an internal combustion engine with a three-way catalyst in an exhaust passage comprising:

supplying fuel to the engine by a fuel injector;

detecting an engine operating condition;

setting an air-fuel ratio in response to the engine operating condition;

controlling a fuel injection amount of the fuel injector based upon the air-fuel ratio;

obtaining a parameter related to NOx density at an engine exit or related to a catalyst temperature;

controlling the air-fuel ratio to a lean range immediately after the engine is started and thereafter, to a rich range;

performing switching the air-fuel ratio from lean to rich based upon the parameter; and setting the air-fuel ratio controlled to be in the rich range as one of a plurality of values based upon the parameter, and also richer as the parameter shows higher NOx density or higher catalyst temperature.

12. An apparatus according to claim 2, wherein engine load is determined based on a fuel injection amount.

* * * * *